July 23, 1946.　　　C. S. McCHESNEY　　　2,404,449
AUTOMATIC TIRE STITCHING MACHINE
Original Filed Oct. 3, 1942　　8 Sheets-Sheet 6

Fig. 6.

INVENTOR.
CUYLER S. McCHESNEY.
BY
his ATTORNEY

Patented July 23, 1946

2,404,449

UNITED STATES PATENT OFFICE 2,404,449

AUTOMATIC TIRE STITCHING MACHINE

Cuyler S. McChesney, Kenmore, N. Y., assignor to Dunlop Tire and Rubber Corporation, Buffalo, N. Y., a corporation of New York Original application October 3, 1942, Serial No. 460,705, now Patent No. 2,394,464, dated February 5, 1946. Divided and this application November 18, 1944, Serial No. 564,159

15 Claims. (Cl. 154—10)

My present invention relates to an automatic tire tread stitching machine, that is, to one in which the tread of a tire after being placed in position on the underlying fabrics is pressed or rolled by disks which pass from a mid line of the tread outwardly to the edges from whence they are removed from the tread and returned to their original position.

The present application is a division of my co-pending application Serial No. 460,705, filed October 3, 1942, for a Tire building machine, now Patent No. 2,394,464, dated February 5, 1946.

In building a tire carcass on a flat drum layers of bias cut fabric are wrapped on said drum with the threads of one layer at an angle to those of the underlying and overlying fabrics, thereafter breaker and chafer strips are applied and, finally, a tread strip is wrapped on the assembled fabrics midway between the ends of the drum. To unite the rubber of the tread strip to the fabric on which it is wrapped it is pressed by a pair of circular disks which bear against the outer surface of the tread strip and as the drum is rotated the disks rotate circumferentially of the drum while they are gradually separated to the edges of the tread strip. After the tread is thus united with the underlying fabrics the drum is collapsed and the carcass shaped in a suitable mold.

In the tire building machine of my previously mentioned Patent No. 2,394,464, the drum is rotated and the various tire elements brought into position thereon in sequence timed by a timer rotated by the drum rotating mechanism and also by a series of manually operated control levers.

While my present invention is particularly suited to the machine shown in said co-pending application, it is applicable to any tire forming machine in which a tread is to be stitched to the underlying fabric.

In my present invention the stitching is automatic so that it is only necessary for the operator to press a control lever whereupon the rotating disks are brought under pressure against the outer surface of the tire tread strip while the drum is rotating so as to cause the disks to rotate about the circumference of the drum and these disks are then slowly and uniformly separated while rotating until they reach the outer edges of the tire strip, whereupon they are automatically withdrawn from contact therewith and returned to their original position.

The various features of the invention are illustrated by way of example in the accompanying drawings in which.

Figure 1:
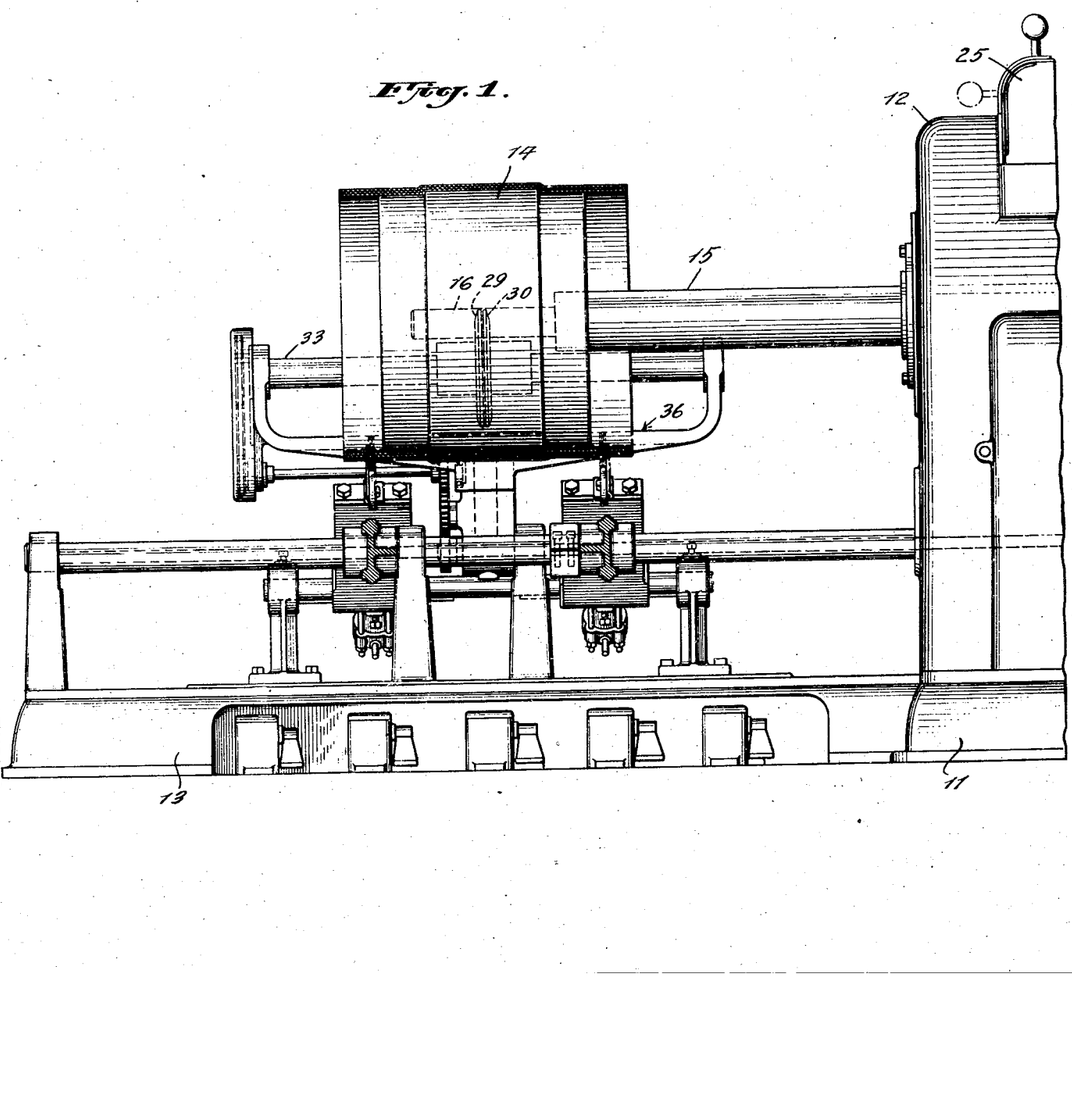
Fig. 1 is a side elevation of the drum to which the invention is applied and a part of the driving and control mechanism.
Figure 2:
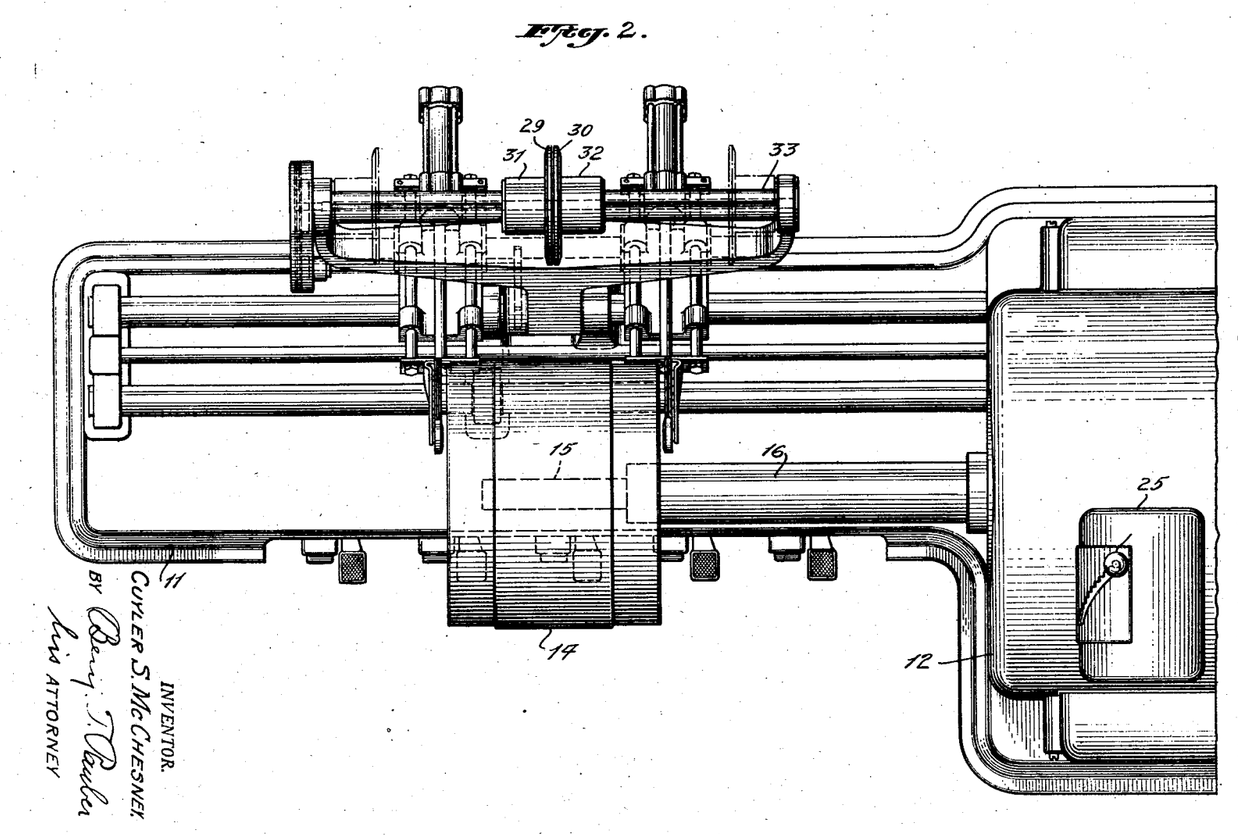
Fig. 2 is a plan view of the mechanism shown in Fig. 1, showing the position of the stitching mechanism relative to the drum.
Figure 3:
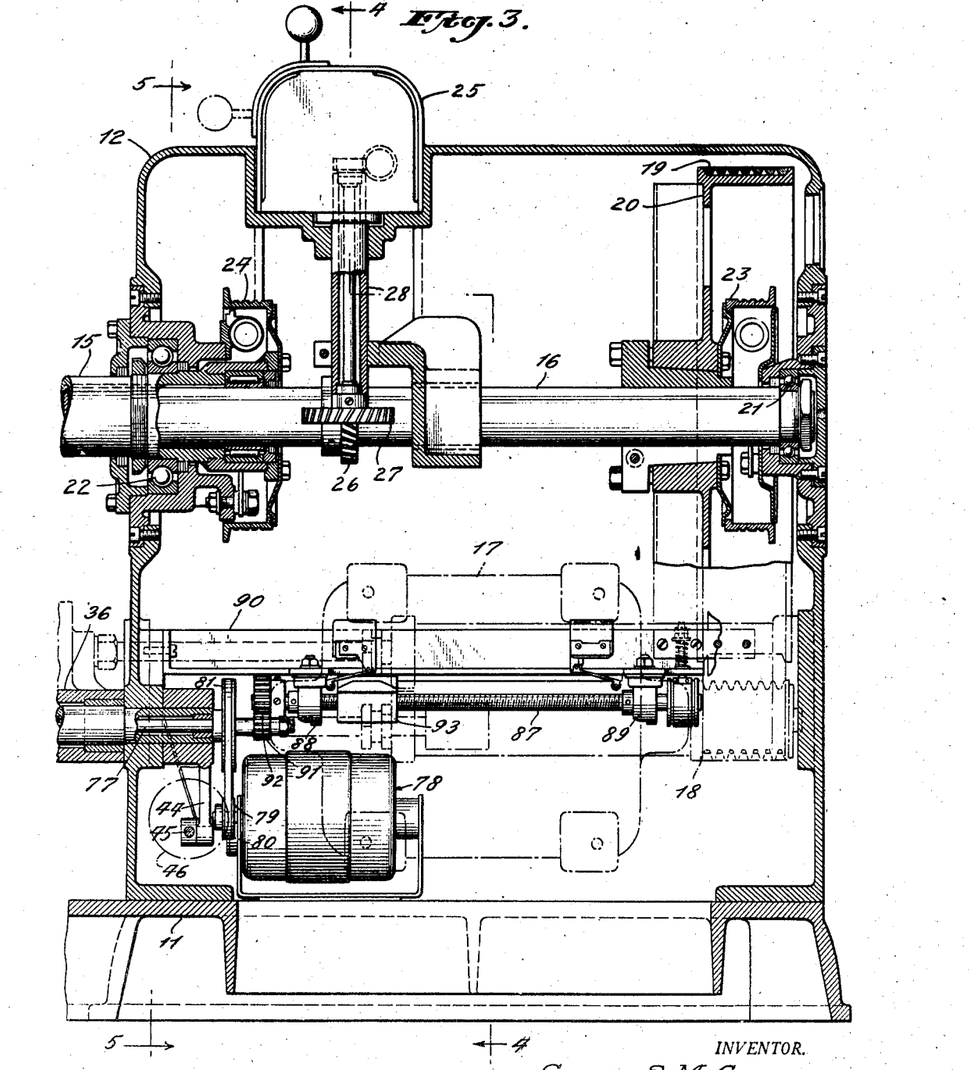
Fig. 3 is a vertical section taken on line 3—3 of Fig. 4 through the driving and control mechanism for the drum and showing the control devices for the stitcher mechanism.

In the tire building machine shown in the accompanying drawings and embodying a preferred form of the invention, the mechanism is mounted on a base 11 having a housing 12 for the drum driving and control mechanisms, said base having an extension 13. A forming drum 14 is mounted over the extension 13 on a hollow rotating shaft 15 and an internal shaft 16 which project from the housing 12 and are driven by a motor 17, Fig. 3, within the housing 12, through a pulley 18 on the motor to a driving belt 19 and a pulley 20 on the inner shaft 16.

The shaft 15 is supported by the shaft 16, one end of which is journaled in roller bearing 21, and by the roller bearing 22. The inner and outer shafts 15 and 16 may be stopped by means of brakes 23 and 24 respectively for the purpose of expanding or collapsing the drum. The various mechanisms are controlled by means of a timer 25 driven from the shaft 16 through gears 26 and 27 and a shaft 28.

The various fabrics of a tire carcass are built up on the drum 14 and the tread is then wrapped about the drum and stitched in position thereon by the stitcher mechanism of the present invention.

Figure 6:
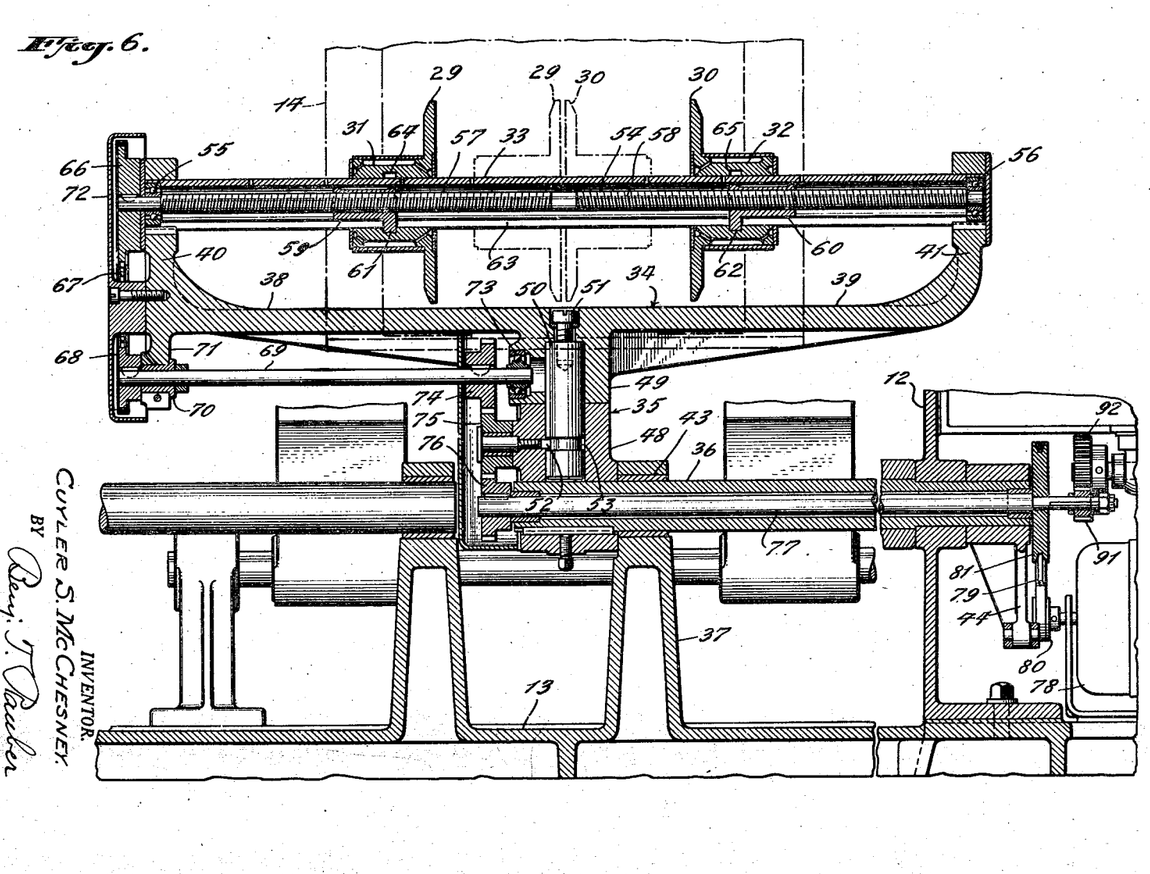
Fig. 6 is a longitudinal sectional view of the stitcher and driving mechanism.

This stitcher mechanism comprises a pair of rollers or disks 29 and 30 having hubs 31 and 32 slidably mounted on a hollow supporting shaft 33 which is mounted at its ends in a suitable bracket 34, Fig. 6. The bracket 34 comprises an arm 35 keyed onto a shaft 36 journalled on a standard 37 and has a pair of branches 38 and 39 extending parallel with the surface of the drum and then turned at right angles to form the supporting ends or heads 40 and 41 for the hollow shaft 33.

The shaft 36 is a hollow rock shaft journalled in a suitable bearing 43 in the standard 37 and in a bearing in the wall of the housing 12.

Figure 4:
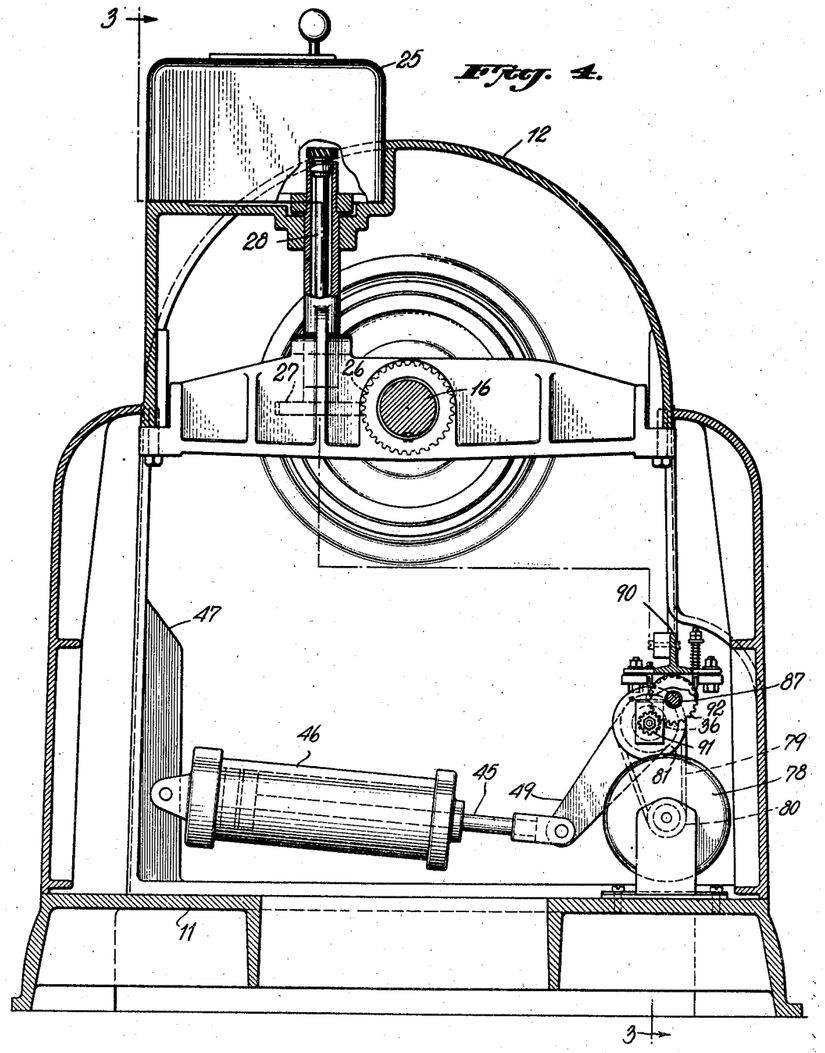
Fig. 4 is a section through the driving and control mechanism taken on line 4—4 of Fig. 3.
Figure 5:
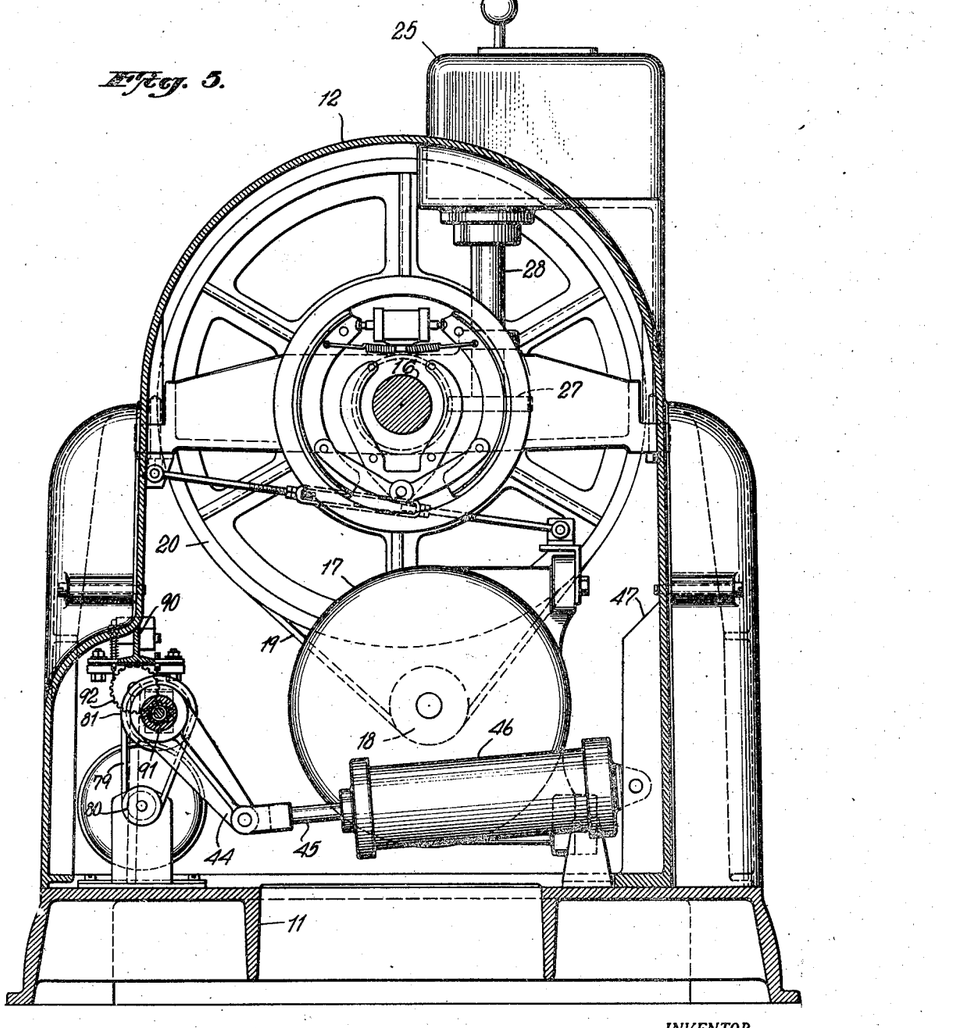
Fig. 5 is a vertical section of the driving and control mechanism taken on line 5—5 of Fig. 3.

Within the housing 12 an arm 44 is rigidly secured or keyed to the shaft 36 and its free end is connected, as shown in Figs. 4 and 5, to the end of a piston stem 45 extending into a pneumatically operated cylinder 46 which is pivoted to a rib 47 in the housing 12.

When actuating fluid under pressure is admitted to the left end of the piston as shown in Fig. 4, or at the right-hand as shown in Fig. 5, forcing the piston rod 45 out of the cylinder, it rocks the shaft 36 clockwise as viewed in Fig. 5, and thus brings the edges of the stitcher disks 29 and 30 into contact with the edge of the tread.

Contact with the tread causes the stitcher disks to rotate on the shaft 33 with a pressure that is controlled by the pressure fluid admitted to the cylinder 46. The disks 29 and 30 are movable longitudinally on the shaft 33 and in order to enable them to follow the contour of the tread the arm 35 of the bracket 34 is made in two parts, a lower part 48 being keyed directly to the shaft 36, and an upper part 49 carrying the arms 38 and 39, being secured to a pivot pin 50 by means of a screw 51, or other suitable means, which extends into a suitable recess in the lower part 48 and is rotatably locked therein by a pin 52 engaging a recess 53 in the pivot pin 50. In this way the upper branched part is secured to the lower supporting part 48 to permit the branches 38 and 39 to tilt, this tilting of the branches on the axis of the pin 50 being limited by any suitable means not shown.

The disks 29 and 30 are substantially in contact face to face and at about the mid line of the forming drum as they are brought into contact with the latter. They are then caused to separate to a predetermined distance while rotating in contact with the surface of the tread and upon further rotation are brought together after they have been tilted out of contact with the tread.

The disks 29 and 30 are moved longitudinally on the shaft 33 by means of a screw shaft 54 extending lengthwise within the hollow shaft 33 and rotatably mounted in bearings 55 and 56 in the heads 38 and 39 of the bracket. The screw shaft 54 has left-hand and right-hand screw threads 57 and 58 extending from its mid point. On the screw threads 57 and 58 are mounted a pair of nuts 59 and 60 which are held from rotation by means of projections 61 and 62 which extend through a longitudinal slot 63, Fig. 6, in the shaft 33 and enter inner annular grooves 64 and 65 of the hubs 31 and 32.

When the shaft 54 is rotated in one direction the nuts 59 and 60 are pushed in opposite directions from the mid point of the screw and the projections 61 and 62 will carry the respective stitcher disks 29 and 30 while permitting these disks to rotate. The screw shaft 54 extends through the end of the bracket 38 and carries a sprocket 66 keyed onto the projecting end of the screw shaft and connected by means of a chain 67, Fig. 6, to a sprocket 68 keyed to the end of a shaft 69 mounted in a suitable bearing 70 in an ear 71 on the bracket branch 38.

Figures 7, 8, 9:
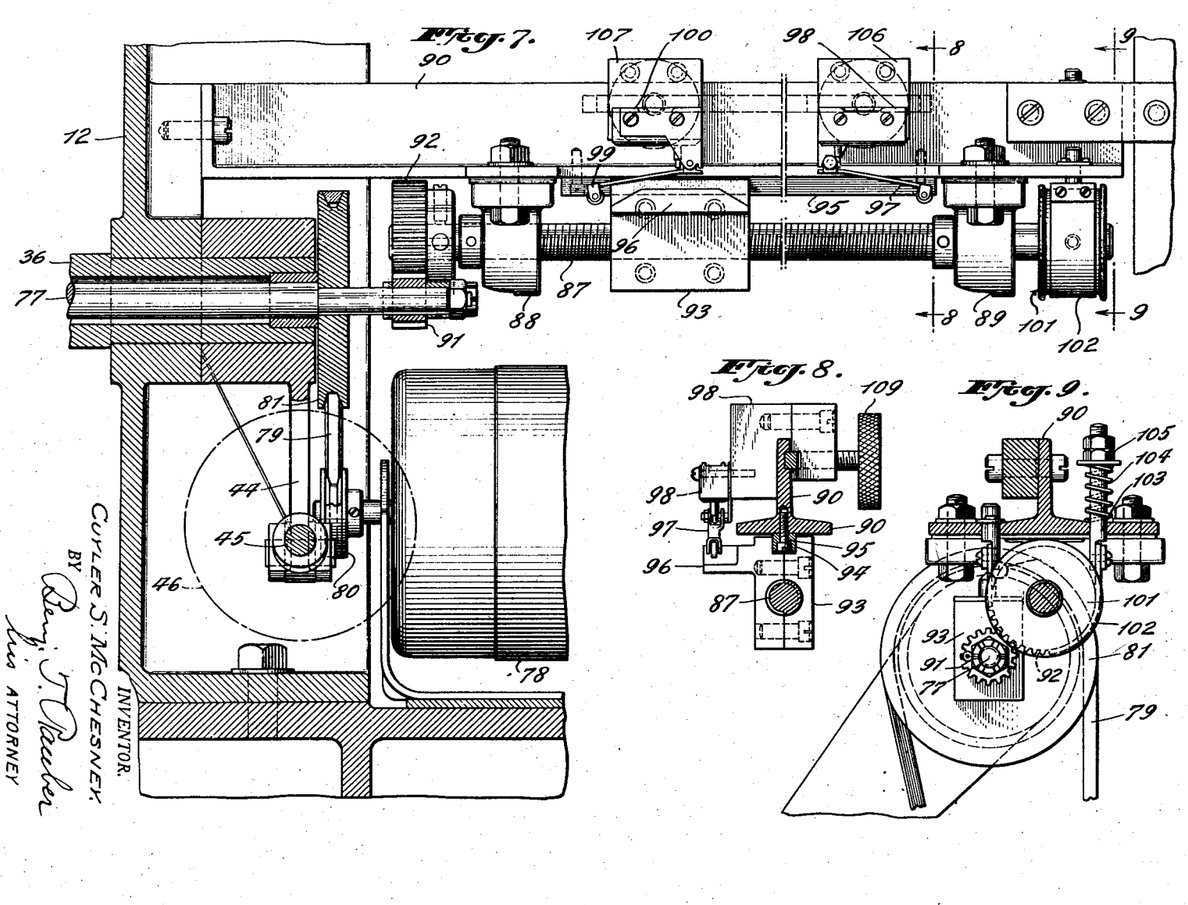
Fig. 7 is a side view on a larger scale of the control mechanism for the stitcher.
Figs. 8 and 9 are respectively sectional views of the stitcher control mechanism taken on lines 8—8 and 9—9 of Fig. 7.

The sprockets 66, 68, and the chain 67 are covered by a suitable cover 72. The opposite end of the shaft 69 is mounted in a suitable bearing 73 on the part 49 of the bracket 34. The shaft 69 is connected through a train of gears 74, 75 and 76 to a drive shaft 77 journalled in and extending through the rock shaft 36 into the housing 12. The shaft 77 is driven from an individual motor 78 within the housing 12, Fig. 7, through a belt 79 connecting the pulley 80 of the motor to a pulley 81 mounted on the projecting end of the shaft 77.

The shaft 77 also drives a limiting device for limiting the travel of the stitcher disks 29 and 30. This limiting device comprises a screw threaded shaft 87 mounted in bearings 88 and 89 suspended at spaced intervals from a cross-beam 90. The shaft 87 is driven from the shaft 77 through a pinion 91 keyed to the shaft 77 and meshing with a gear 92 keyed or pinned on the screw shaft 87. The shaft 87 is thereby rotated in fixed relation to the shaft 77.

A nut 93 is threaded on the shaft 87 and is provided with a groove 94 in its upper edge which receives a guide bar 95 secured to the lower surface of the cross-beam 90 to prevent the nut from rotating. As the shaft 87 is rotated in one direction or the other the nut 93 moves in a corresponding direction lengthwise of the shaft 87. The nut 93 is provided with a sidewise extending cam 96, as shown particularly in Figs. 7 and 8, which engages and lifts a lever arm 97 of a limiting switch 98 or a lever 99 of a limit switch 100. When the motor 78 is to be started the nut 93 will be below one of the levers 97 or 99, depending upon the direction in which the disks 29 and 30 and, correspondingly the shaft 87, is to rotate.

As the disks 29 and 30 and shaft 87 rotate, the nut 93 is threaded forwardly on the shaft 87 until it contacts with, and lifts, the other of the levers 97 and 99, whereupon the corresponding switch acts to reverse the motor 78 and, accordingly, the nut 93 threads its way back to its original position and, lifting the corresponding switch lever, opens the circuit contact to the motor 78 which thereupon stops.

In order to prevent the shaft 87 from overriding its position, a suitable resistance to rotation may be provided by means of a brake drum 101 keyed on the shaft 87 and engaged by a flexible brake band 102 secured at one end on the cross beam 90 and at the other end to a rod 103 which is resiliently pressed upwardly by means of a spring 104 confined between the beam 90 and retaining nut 105.

The switches 98 and 100 are mounted on blocks 106 and 107 which are slidably mounted on an upwardly projecting web of the beam 90 and may be secured in any desired position by means of a set screw 109. The switches may thereby be adjusted to provide any desired interval between the starting and stopping of the motor 78 and the stitching disks 29 and 30.

Figure 10:
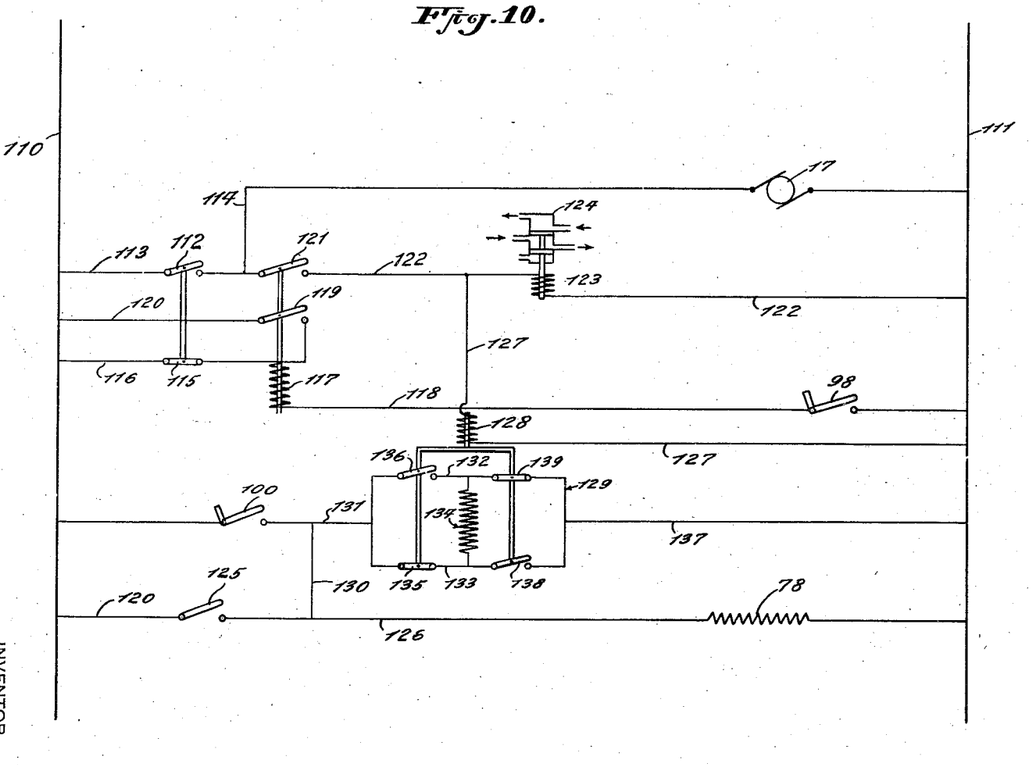
Fig. 10 is a wiring diagram showing the electric circuit for the control of the various elements.

The electric circuits for controlling the above mechanism are shown in the wiring diagram of Fig. 10. In this diagram current is supplied from the mains 110 and 111. At the time that the tread stitcher operates the drum 14 rotates at a high speed. To start the rotation of the drum motor 17 a switch 112 is closed thereby closing a circuit through a wire 113 to a branch wire 114 and the high speed starting mechanism for the motor 17. This starts and rotates the drum 14 at a high speed.

The switch 112 is connected to a switch 115 in a branch circuit 116 in such manner that the switch 115 is normally closed when the switch 112 is open and is opened when the switch 112 is closed. Normally, therefore, current passes through the branch circuit 116 and the closed switch 115 to an electromagnet 117 and thence through a wire 118 and the out limit switch 98 which is closed at the start of the stitcher mechanism.

The energizing of the electromagnet 117 also closes a switch 119 in a shunt circuit 120 thus maintaining a circuit through the electromagnet 117 after the switch 115 is opened.

The energizing of the electromagnet 117 also closes a switch 121 in a branch circuit 122 leading from the branch 113 through an electromagnet 123, which controls a valve 124 for the admission of pressure fluid to the cylinder 46 entering at the left end of the cylinder as viewed in Fig. 4. This rotates the disk carrying bracket 34 to bring the disks 29 and 30 against the surface of the tread with a pressure governed by the pressure fluid admitted to the cylinder 46. At the same time it closes a pressure actuated switch 125 in a branch circuit 126 leading from the main 110 through the windings or control mechanisms of the stitcher motor 78 setting this motor in operation.

The direction of the motor is controlled by a branch circuit 127 leading from the branch circuit 122 through a solenoid 128 which controls a reversing and starting mechanism 129. Current is supplied to the starting mechanism initially through the branch circuit 126 and the pressure switch 125 and a connecting shunt 130. The shunt 130 connects with a branch circuit 131 which is closed by an in limit switch 100. The current is supplied initially through the circuits 126, 130 and 131 until the motor is started and the disks separate whereupon the in limit switch 100 closes and current then flows directly from the main 110 to the control mechanism 129.

The control mechanism 129 comprises a pair of branch circuits 132 and 133 connected to each other through a reversing circuit 134 and connected alternatively to the circuit 131 by switches 135 and 136 operated by the solenoid 128 in such a manner that one is closed when the other is opened.

The circuits 132 and 133 are connected to a return circuit 137 leading to the main 111 by means of a pair of switches 138 and 139 which are also controlled by the solenoid 128 and operate in the reverse of the switches 135 and 136.

It will be apparent, therefore, that when the solenoid 128 is energized current will flow through one of the switches as, for example, 135, thence in one direction through the control circuit 134 and through the switch 139 to the branch 137 and main 111. This continues until the out limit switch 98 is opened whereupon the circuit through the electromagnet 117 is opened, opening both of the switches 119 and 121. This breaks the circuit through the electromagnet 123 of the fluid control valve 124, reversing the position of this valve, whereupon the bracket 34 falls away or is withdrawn from the drum 14.

Also the circuit is broken through the solenoid 128 opening those switches in the control mechanism 129 that were closed and closing those that were open and thus reversing the current through the control coil 134. Thereupon the direction of rotation of the motor 78 is reversed, reversing the rotation of the shaft 87 and the screw shaft 54. The disks are, therefore, returned to their original central position at the same time the cam 96 is moved back until it opens the in limit switch 100.

Inasmuch as the switch 125 has been opened by the release of pressure on the bracket 34 the opening of the in limit switch 100 breaks the circuit through the motor 78 and the control device 129, thereupon the motor stops as the disks reach their original position as indicated in broken lines in Fig. 6.

It will be understood that the above wiring is purely diagrammatic and that other wiring arrangements might be made.

Through the above apparatus the tread is given a uniform predetermined stitching which may be adjusted by adjustment of the position of the switch 98 for any width of tread. The stitching continues uniformly from the mid point of the tread to the outer limit for which the mechanism is set, and upon reaching this predetermined outer limit is withdrawn and returned to its original position without requiring attention by the operator. It is only necessary for the operator to close the switch 112, or operate a mechanism for closing it as described in my previously mentioned Patent No. 2,394,464, whereupon the stitching of the tread will be accomplished without such variation as might occur if the operation were controlled by the operator. The result is that the stitching for each tread is uniform without danger of falling short of the edge of the tread or overrunning this edge.

What I claim is:

1. A tread stitcher for stitching tread on a tire carcass on a rotatable forming drum which comprises a shaft, a pair of stitching disks rotatably and slidably mounted on said shaft, means to move said shaft to bring the peripheries of said disks against the tread on said forming drum, means to slide said disks toward and from each other on said shaft, control means comprising an electric circuit having a pair of cam operated switches to control the direction and extent of movement of said disks, a cam for operating said switches and means to move said cam to and from said switches in proportion to the movement of said disks.

2. A tread stitcher for stitching tread on a tire carcass on a rotatable forming drum which comprises a shaft, a pair of stitching disks rotatably and slidably mounted on said shaft, means to move said shaft to bring the peripheries of said disks against the tread on said forming drum, means to slide said disks toward and from each other on said shaft, control means comprising an electric circuit having a pair of cam operated switches to control the direction and extent of movement of said disks, a cam for operating said switches, means to move said cam to and from said switches in proportion to the movement of said disks and means to adjust the positions of said switches relative to the path of movement of said cam.

3. A tread stitcher for stitching tread on a tire carcass on a rotatable forming drum which comprises a shaft, a pair of stitching disks rotatably and slidably mounted on said shaft, fluid actuated means to move said shaft and disks toward and from the forming drum to bring the peripheries of said disks against said tread, means to slide said disks toward and from each other on said shaft, control means comprising an electric circuit having a pair of cam operated switches to control the direction and extent of movement of said disks and the admission of fluid to said fluid actuated means, a cam for operating said switches and means to move said cam to and from said switches in proportion to the movement of said disks.

4. A tread stitcher for stitching tread on a tire carcass on a rotatable forming drum which comprises a bracket having a stem and a pair of arms, a support for said bracket to permit said bracket to rock to and from said drum and about the axis of said stem, a shaft mounted between the arms of said bracket, a pair of stitching disks rotatably and slidably mounted on said shaft, means to slide said disks to and from each other on said shaft, control means comprising an electric circuit having a pair of cam operated switches to control the direction and extent of movement of said disks, a cam movable to operate said switches alternatively and means to move said cam to and from said switches in proportion to the movement of said disks on said shaft.

5. A tread stitcher for stitching tread on a tire carcass on a rotatable forming drum which comprises a shaft substantially parallel to the axis of rotation of said drum, a pair of disks rotatable on said shaft and slidable thereon to and from a position substantially midway of said tread, a shaft threaded oppositely from a mid point, a pair of nuts one for each disk threaded on said oppositely threaded parts of said shaft and movable toward or from each other as said shaft is rotated forwardly or in reverse, said disks rotatably engaging their respective nuts, an electric circuit having a pair of spaced cam operated switches one to limit the outward movement and the other the inward movement of said disks, a screw driven synchronously with said shaft and a cam threaded on said screw to operate said switches alternatively in its movement on said screw.

6. A tread stitcher for stitching tread on a tire carcass on a rotatable forming drum which comprises a bracket tiltable to and from said drum, a shaft mounted on said bracket substantially parallel to the axis of rotation of said drum, a pair of disks rotatable on said shaft and slidable thereon to and from a position substantially midway of said tread, a shaft on said bracket threaded oppositely from a mid point, a pair of nuts one for each disk threaded on said oppositely threaded parts of said shaft and movable toward or from each other as said shaft is rotated forwardly or in reverse, said disks rotatably engaging said nuts, an electric circuit comprising means to start and reverse the rotation of said shaft and the tilting of said bracket toward and from said drum and having a pair of spaced cam operated switches to start and reverse the rotation of said shaft, a screw driven synchronously with said shaft, and a cam threaded on said screw to engage said switches alternatively in its movement on said screw.

7. A tread stitcher for stitching tread on a tire carcass on a rotatable forming drum which comprises a bracket pivoted to swing toward and from said drum and having a pair of arms, a rotatable screw threaded shaft mounted on and between said arms and threaded oppositely from the mid point of said drum, a supporting shaft, a pair of disks rotatable and slidable on said supporting shaft, nuts threaded on said rotatable screw threaded shaft each rotatably engaged by one of said disks, an electric circuit comprising means to drive said threaded shaft forwardly and in reverse and having a pair of spaced starting and reversing switches, a cam movable to operate said switches alternatively, a screw engaging said cam, and gearing connecting said screw and said rotatable shaft to rotate in fixed relation.

8. A tread stitcher for stitching tread on a tire carcass on a rotatable forming drum which comprises a bracket pivoted to swing toward and from said drum and having a pair of arms, a rotatable screw threaded shaft mounted on and between said arms and threaded oppositely from the mid point of said drum, a supporting shaft, a pair of disks rotatable and slidable on said supporting shaft, nuts threaded on said rotatable screw threaded shaft each rotatably engaged by one of said disks, an electric circuit comprising means to drive said threaded shaft forwardly and in reverse and having a pair of spaced starting and reversing switches, a cam movable to operate said switches alternatively, a screw engaging said cam, gearing connecting said screw and said rotatable shaft to rotate in fixed relation, fluid operated means to tilt said bracket toward and from said drum and means in said circuit to control the admission of fluid to and its exhaust from said fluid operated means.

9. In a tire building machine a rotatable drum, a pivoted bracket having a hollow shaft parallel to the axis of said drum and having a longitudinal slot, a pair of disks rotatable and slidable on said shaft, means to tilt said bracket to bring the edges of said disks into engagement with the surface of said drum, a rotatable screw within said shaft and threaded oppositely from the central plane of said drum, nuts, one for each disk, threaded on said screw on opposite sides of said plane and projecting through the slot of said shaft to said respective disks to move said disks to and from each other by the rotation of said screw relative to said nuts and means to limit rotation of said shaft and separation of said disks, said means comprising a screw rotatable in definite relation to said first screw, electric circuits comprising adjustably fixed contacts and a nut threaded on said second screw in position to close and open said contacts.

10. In a tire building machine a rotatable forming drum, a pair of stitching disks freely rotatable on an axis parallel to that of said drum, rotatable means to separate and return said disks, a screw rotating in fixed relation to said rotating separating means, a nut threaded on said screw and held against rotation to move in one direction or the other as said screw is rotated in one direction or the other, fixed switches in the path of said nut to be closed by contact therewith and electric circuits closed by said respective switches to reverse and to stop said disk moving means.

11. In a tire building machine, a rotatable forming drum, a pair of stitching disks freely rotatable on an axis substantially parallel to that of said drum, rotatable means to separate and return said disks, a movable switch actuating member, means to move said member back and forth in fixed relation to the positions of said disks and a circuit controlling the movement of said disks and comprising spaced switches actuated by said switch actuating member to stop and start the movement of said disks.

12. A tread stitcher for stitching elements of a tire carcass on a rotatable forming drum which comprises a shaft, a pair of stitching disks rotatably and slidably mounted on said shaft, means to move said shaft to bring the peripheries of said disks against the carcass on said forming drum, means to slide said disks toward and from each other on said shaft, and control means comprising an electric circuit, an electromagnet in said circuit to control the movement of said shaft toward and from said drum, a branch circuit to control the disk sliding means, a pressure switch in said branch circuit actuated by pressure of said disk against said drum to energize the disk sliding means, means to move said disks from each other, an out limit switch to reverse said disk sliding means and to reverse the electromagnet controlling the movement of said shaft toward said drum and an in limit switch to stop the disk sliding means.

13. A tread stitcher for stitching elements on a tire carcass on a rotatable forming drum which comprises a shaft substantially parallel to the axis of rotation of said drum, a pair of disks rotatable on said shaft and slidable thereon to and from a position substantially midway of said tread, a shaft threaded oppositely from a mid point, a pair of nuts one for each disk threaded on said oppositely threaded parts of said shaft and movable toward or from each other as said shaft is rotated forwardly or in reverse, said disks rotatably engaging their respective nuts, an electric circuit having means actuated thereby to advance said disk carrying shaft toward said drum to press said disks edgewise against the peripheral surface of said drum, a pressure actuated switch actuated on the pressing of said disks against said peripheral surface to actutae said threaded shaft and a pair of cam operated switches, one to limit the outward movement and the other the inward movement of said disks, a screw driven synchronously with said shaft and a cam threaded on said screw to operate said switches alternatively in its movement of said screw.

14. A tread stitcher for stitching tire elements on a rotating forming drum which comprises a pair of stitching disks, means to advance said disks into edgewise pressure engagement with the tire elements on said drum and reversely away from said drum, means to move said disks from mid position outwardly toward the opposite ends of said drum and reversely, a control cam and means to move said cam in one direction with, and in proportion to, the outward movement of said disks and reversely, and an electric control circuit comprising a starting switch, means to control said disk advancing means on actuation of said starting switch, a pressure switch actuated on pressure engagement of said disks against said drum and controlling the outward movement of said disks, an out limit switch actuated by said cam to reverse said disk advancing means and said disk moving means and an in limit switch actuated by said cam to stop said reverse movement of said disk moving means.

15. The tread stitcher of claim 14 and a circuit controlled by said starting switch to control the rotation of said drum.

CUYLER S. McCHESNEY.